United States Patent
Jose Yacaman et al.

(10) Patent No.: US 10,060,799 B2
(45) Date of Patent: Aug. 28, 2018

(54) SELF-ASSEMBLED NANOSTRUCTURE BOLOMETERS AND METHODS OF USE THEREOF

(71) Applicants: Miguel Jose Yacaman, San Antonio, TX (US); Francisco Javier Gonzalez, San Luis Potosi (MX); J. Jesus Velazquez Salazar, San Antonio, TX (US); John Eder Sanchez, San Antonio, TX (US); Arturo Ponce-Pedraza, San Antonio, TX (US); Fernando Mendoza Santoyo, San Antonio, TX (US)

(72) Inventors: Miguel Jose Yacaman, San Antonio, TX (US); Francisco Javier Gonzalez, San Luis Potosi (MX); J. Jesus Velazquez Salazar, San Antonio, TX (US); John Eder Sanchez, San Antonio, TX (US); Arturo Ponce-Pedraza, San Antonio, TX (US); Fernando Mendoza Santoyo, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 15 days.

(21) Appl. No.: 15/436,082

(22) Filed: Feb. 17, 2017

(65) Prior Publication Data
US 2017/0234735 A1 Aug. 17, 2017

Related U.S. Application Data

(60) Provisional application No. 62/296,426, filed on Feb. 17, 2016.

(51) Int. Cl.
*B05D 5/12* (2006.01)
*B32B 5/16* (2006.01)
(Continued)

(52) U.S. Cl.
CPC ...... *G01J 5/22* (2013.01); *B22F 9/24* (2013.01); *B22F 2301/255* (2013.01)

(58) Field of Classification Search
CPC .......... G01J 5/22; B22F 9/24; B22F 2301/255
(Continued)

(56) References Cited

U.S. PATENT DOCUMENTS 7,422,696 B2 * 9/2008 Mirkin ............... B82Y 5/00
205/118

* cited by examiner

*Primary Examiner* — William K Cheung
(74) *Attorney, Agent, or Firm* — Thomas | Horstemeyer, LLP

(57) ABSTRACT

A variety of nanostructures are provided having a metal nanowire having a plurality of faces extending along a length of the nanowire, and a plurality of semiconductor nanorods forming two or more nanorod arrays, wherein each of the nanorod arrays is attached to a different surface of the nanowire. For example, in some embodiments, the nanostructure is a silver nanowire having a pentagonal cross section and five faces extending along the length of the nanowire, and metal oxide nanorods forming five nanorod arrays extending along each of the five faces of the silver nanowire. The nanostructures can demonstrate high temperature coefficients of resistance, and can be used in a variety of bolometric materials. In some embodiments, bolometric materials are provided including a plurality of the nanostructures deposited onto a surface of a substrate. Methods of making the nanostructures and bolometers are also provided.

20 Claims, 19 Drawing Sheets

(51) Int. Cl.
*H01L 21/302* (2006.01)
*G01J 5/22* (2006.01)
*B22F 9/24* (2006.01)

(58) Field of Classification Search
USPC .......................... 428/327; 427/117; 438/754
See application file for complete search history.

Ag/ZnO-Multi-pentagonal arrangement

SELF-ASSEMBLED NANOSTRUCTURE BOLOMETERS AND METHODS OF USE THEREOF

CROSS-REFERENCE TO RELATED APPLICATIONS

This application claims priority to, and the benefit of, co-pending U.S. provisional application entitled "SELF-ASSEMBLED NANOSTRUCTURE BOLOMETERS AND METHODS OF USE THEREOF" having Ser. No. 62/296,426, filed Feb. 17, 2016, the contents of which are incorporated by reference in their entirety.

TECHNICAL FIELD

The present disclosure generally relates to nanostructured bolometric materials and methods of use thereof.

BACKGROUND

When considering the range detection that is incident upon an active region of a detector it is important to amplify the electrical output signal, which is a function of the amount of radiation that is incident upon an active region of the detector. Infrared detectors are those detectors, which are sensitive to radiation in the infrared region of the electromagnetic spectrum. There are two types of infrared detectors, thermal detectors including bolometers and photon detectors. The photon detectors function based upon the number of photons that are incident upon and interact with electrons in a transducer region of the detector. The photon detectors, since they function based on direct interactions between electrons and photons, are highly sensitive and have a high response speed compared to the bolometers. However, they have a shortcoming in that the photon detectors operate well only at low temperatures necessitating a need to an incorporate therein an additional cooling system. The bolometers function, on the other hand, based upon a change in the temperature of the transducer region of the detector due to absorption of the radiation. The bolometers provide an output signal, i.e., a change in the resistance of materials (called bolometer elements), that is proportional to the temperature of the transducer region. The bolometer elements have been made from both metals and semiconductors with an increasing effort to combine metal-semiconductor materials. As it is well known in metals, the resistance change is essentially due to variations in the carrier mobility, which typically decreases with temperature. Greater sensitivity can be obtained in high-resistivity metal-semiconductor bolometer elements in which the combination of free-carrier density (i.e., the contribution due to the semiconductor material) along the contribution associated with the metal element undoubtedly increase the performance on the bolometric material.

There is a tremendous effort towards finding alternatives to currently used standard materials in order to enhance the performance of bolometric devices. Materials used in commercial bolometers, like the ones used in infrared imaging systems, require a high temperature coefficient of resistance (TCR), low conductivity and the possibility of performing lithographic patterns on them. The responsivity RV of a bolometer, i.e. the output signal voltage per incident infrared power, is given by $$R_V = \frac{I_b R \beta \eta}{G\sqrt{1+\omega^2 \tau^2}}$$

where $I_b$ is the bias current, R is the dc resistance, $\beta$ is the temperature coefficient of resistance (TCR), $\eta$ is the absorptivity, G is the thermal conductance between sensitive element and the substrate, $\omega$ is the angular modulation frequency of the incident radiation, and $\tau$ is the thermal response time which is given by C/G. C is the heat capacity (thermal mass) of the sensitive element. Therefore, a microbolometer requires a temperature sensitive element that displays a high TCR and a structure that has a low thermal conductance and thermal mass. Recently, Zinc oxide has attracted a lot of attention due to its potential to have TCR values higher than Vanadium oxide ($VO_x$) and amorphous Silicon (a-Si), which are the most common materials used in bolometric applications. In addition to its potentially high TCR values, the optical properties of ZnO are also important due to its wide bandgap of 3.37 eV with a large excitation binding energy of 60 meV.

There remains a need for improved bolometric materials and methods of making thereof.

SUMMARY

A variety of bolometric materials are provided, including materials having one or more nanostructures incorporated therein. In various aspects, the nanostructures include a metal nanowire having a plurality of faces extending along a length of each nanowire, and a plurality of semiconductor nanorods forming two or more nanorod arrays, wherein each of the nanorod arrays is attached to a different surface of the nanowire. In certain aspects the nanostructure includes a silver nanowire having a pentagonal cross section and five faces extended along a length of the nanowire, and a plurality of semiconductor nanorods forming five nanorod arrays, wherein each of the nanorod arrays is attached to one of the five surfaces extended along the length of the nanowire. In various aspects the nanorods are zinc oxide nanorods.

Nanostructures are provided having a variety of metal nanowires. In various aspects, the metal nanowire is a silver nanowire, a gold nanowire, a nickel nanowire, an iron nanowire, a copper nanowire, or a combination thereof. The metal nanowire can have a length of about 10 nm to 10 µm. The metal nanowire can have a diameter of about 5 nm to 500 nm.

The nanostructure can have a variety of semiconductor nanorods. The semiconductor nanorods can be metal oxide nanorods such as oxides of cadmium, gallium, indium, tin, zinc, or combinations thereof. The semiconductor nanorods can have an average diameter of about 50 nm to 250 nm. The semiconductor nanorods can have an average length of about 500 nm to 1.5 µm.

Various bolometric materials containing the nanostructure described herein are provided. The bolometric materials can include a plurality of the nanostructures on a surface of a substrate such as silicon. The bolometric materials can include a conductive polymer, e.g. as a substrate and/or on the substrate wherein the nanostructures are embedded in the conductive polymer. The bolometric materials can have a large temperature coefficient of the resistance, .e.g. about −10 $K^{-1}$ to −18 $K^{-1}$. In various aspects, the bolometric temperatures operate at a range of temperatures at or near room temperature. For example, in some aspects the bolometric material has a maximum temperature coefficient of the resistant at a temperature from 285 K to 310 K. The bolometric materials can be used in a variety of electronic devices, e.g. a monocular scope, a binocular scope, a digital camera, a video camera, an infrared thermometer, a night vision device, or a combination thereof.

Various methods of making the nanostructures and bolometric materials are also provided. The methods can include making a metal nanowire, e.g. combining a metal salt and a reducing agent in a first solution for a first period of time to produce a metal nanowire having a plurality of faces extending along a length of the nanowire. In various aspects the metal nanowire is a silver nanowire and the metal salt is a silver salt such as $AgNO_3$. The methods can include combining the metal nanowire and a semiconductor precursor in a second solution for a second period of time to produce a plurality of semiconductor nanorods forming two or more nanorod arrays, wherein each of the nanorod arrays is attached to a different surface of the nanowire. In various aspects, the semiconductor nanorods are zinc oxide nanorods and the semiconductor precursor is a solution of zinc acetate dihydrate and hexamethylenetetramine. The first period of time, the second period of time, or both can be from about 30 minutes to 60 minutes. In some aspects, the methods can further include heating one or both of the first solution and the second solution. In some aspects, the methods also include irradiating the second solution with microwave radiation.

Other systems, methods, features, and advantages of the nanostructures, bolometric materials, and methods of making thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 1A is a micrograph of an experimental nanosystem as observed using a Scanning Transmission Electron Microscope (SEM). FIG. 1B is a model of the Ag/ZnO system showing the multi-pentagonal distribution.

FIG. 2A is a cross view section of an experimental bolometric system as growth by microwave irradiation process. FIG. 2B and FIG. 2C are models depicting the distribution Ag/ZnO after the deposition process. FIG. 2D is an experimental SEM image with Ag/ZnO lying in the silicon surface.

FIG. 3A is a cross view section of an experimental bolometric nanostructure as grown by microwave irradiation process. FIG. 3B is a model matching the experimental pentagonal arrangement of ZnO growing on the faces of the silver nanowire.

DETAILED DESCRIPTION

Figure 1A:
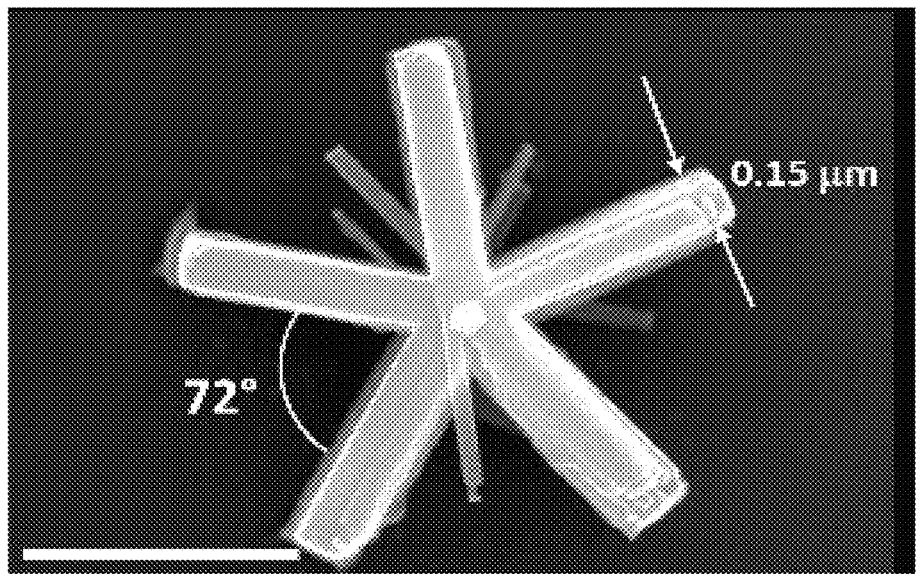
FIGS. 1A-1B depict the multi-pentagonal arrangement showing ZnO nanorods, growing perpendicular to the silver nanowires facets.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "nanowire," as used herein, means a nanomaterial having one dimension (a length) significantly longer than the remaining two dimensions (the diameter) and an aspect ratio (length/diameter) of about 10, 20, 30, 40, 50, 60, 70, 80, 90, 100, 150, 200, or more. The length of the nanowire can be about 10 nm to 100 μm or more, e.g. about 10 nm to 100 μm, 10 nm to 10 μm, 100 nm to 10 μm, 250 nm to 10 μm, 500 nm to 10 μm, 1 μm to 10 μm, or 2 μm to 10 μm. The diameter of the nanowire can be measured as the largest cross-sectional dimension perpendicular to the length of the nanowire, e.g. about 5 nm to 500 nm, 10 nm to 500 nm, 10 nm to 250 nm, 30 nm to 250 nm, 30 nm to 200 nm, 30 nm to 150 nm, or 30 nm to 100 nm The term "nanorod," as used herein, means a nanomaterial having one dimension (a length) longer than the remaining two dimensions (the diameter) and an aspect ratio (length/diameter) that is less than that of a nanowire, e.g. about 2 to 20, about 2 to 10, about 2 to 8, about 3 to 8, about 3 to 7, about 4 to 7, or about 4 to 6. The length of the nanorod can be about 50 nm to 1.5 μm, about 100 nm to 1.5 μm, about 100 nm to 1 μm, about 200 nm to 1 μm, about 500 nm to 1 μm, or about 750 nm to 1 μm. The diameter of the nanorod can be measured as the largest cross-sectional dimension perpendicular to the length of the nanorod, e.g. about 10 nm to 250 nm, about 10 nm to 200 nm, about 20 nm to 200 nm, about 50 nm to 200 nm, or about 100 nm to 200 nm.

The term "temperature coefficient of resistance," abbreviated "TCR" is used herein to mean the change in the resistance of a material as a function of the change in the material temperature. The TCR can be given by the ratio of the change in resistance, often given as a percentage change in resistance, divided by the change in temperature. As used herein, the TCR is described by the symbol α with units of $(°C.)^{-1}$ or $K^{-1}$ indicating a unit-less change in the resistance (a % change) for each degree change in temperature. As used herein, a positive value for the TCR indicates the resistance increases with increasing temperature, while a negative value of TCR indicates the resistance decreases with increasing temperature. Conventional materials exhibit TCR values around 2%-3% $K^{-1}$.

Nanostructures and Bolometric Materials Containing Nanostructures

Bolometric materials with high sensitivity for the detection of infrared radiation are provided. The bolometric material can have zinc oxide nanorods and silver nanowires forming a particular hierarchical configuration with zinc oxide nanorods growing perpendicular to the silver nanowires pentagonal faces along the silver nanowire axis. The synthesized material hereafter Ag/ZnO can exhibit high stability in the temperature range (295-335K) as well as high sensitivity when used as an active element on bolometric infrared detectors.

As mentioned, the bolometric Ag/ZnO material can have silver nanowires acting as supported core for zinc oxide nanorods growing epitaxially to the silver nanowires faces. Furthermore, the new Ag/ZnO bolometric material could be set to growth on a multi-pentagonal arrangement of ZnO nanorods distributed along silver nanowires recreating a multi-pentagonal antenna. Because the particular configuration, the bolometric material possess a temperature coefficient of the resistance (TCR) around 11% working in the range 295 K-335K. This feature can enable the material to act as radiated infrared detector, i.e., when used as an active element on the bolometric device, it can produce an output electrical signal, which varies as function of the electromagnetic radiation that is incident upon the surface of the bolometric material in the active region of the detector.

Figure 1B:
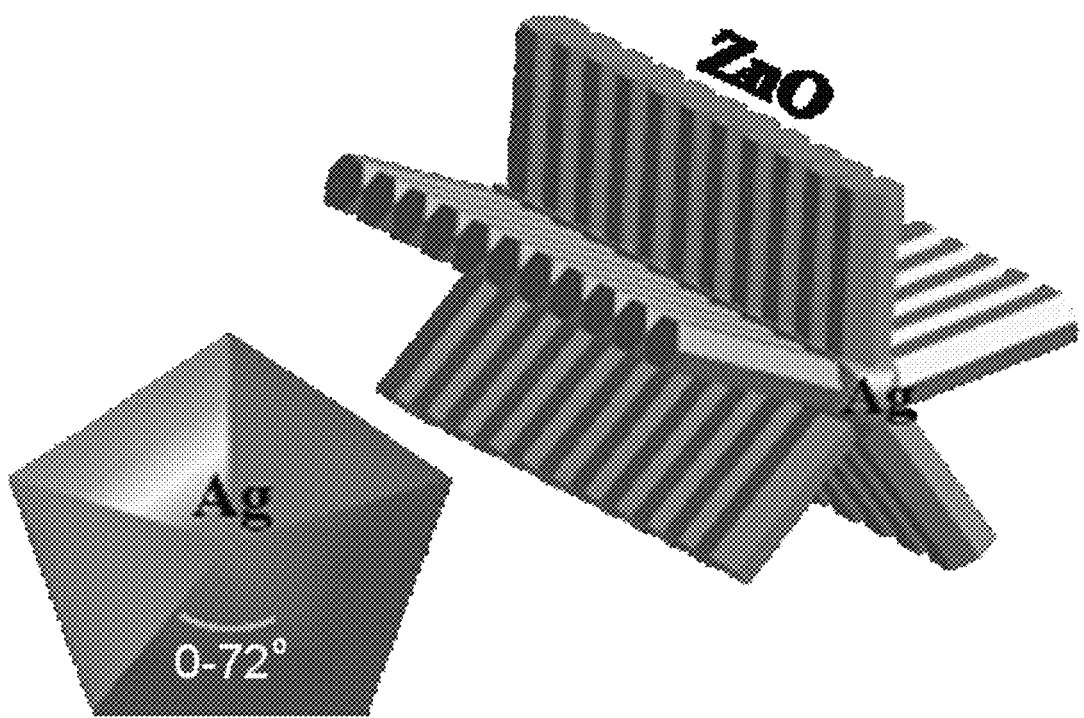
Figure 2A:
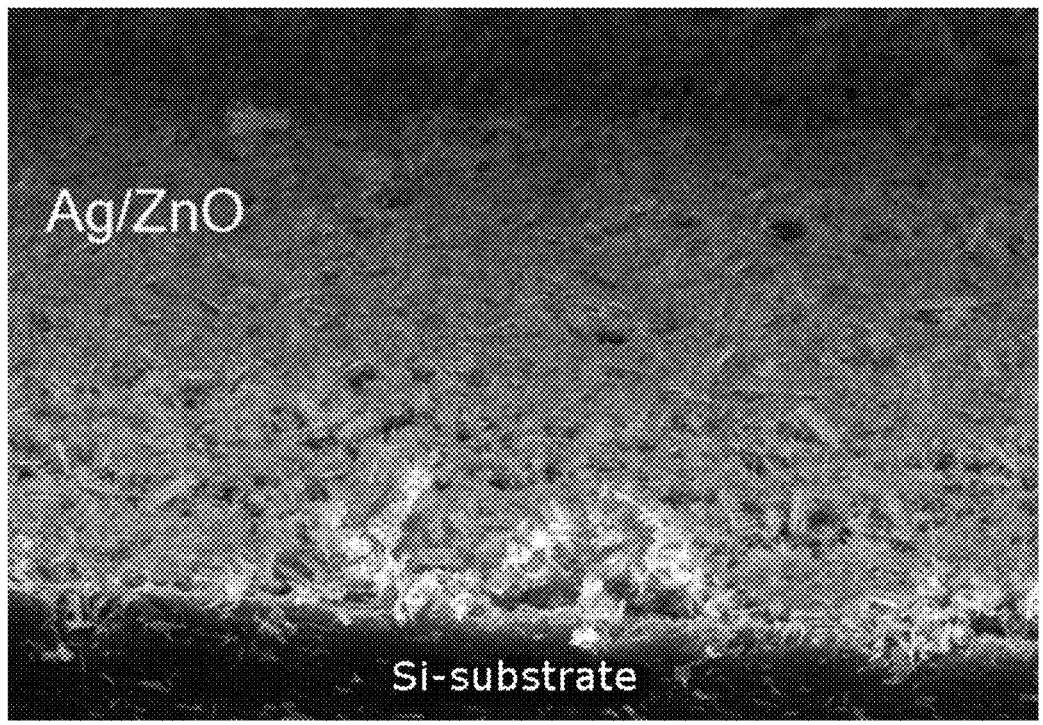
FIGS. 2A-2D depict a silicon substrate with multi-pentagonal arrangement of Ag/ZnO nanorods.
Figure 2B:
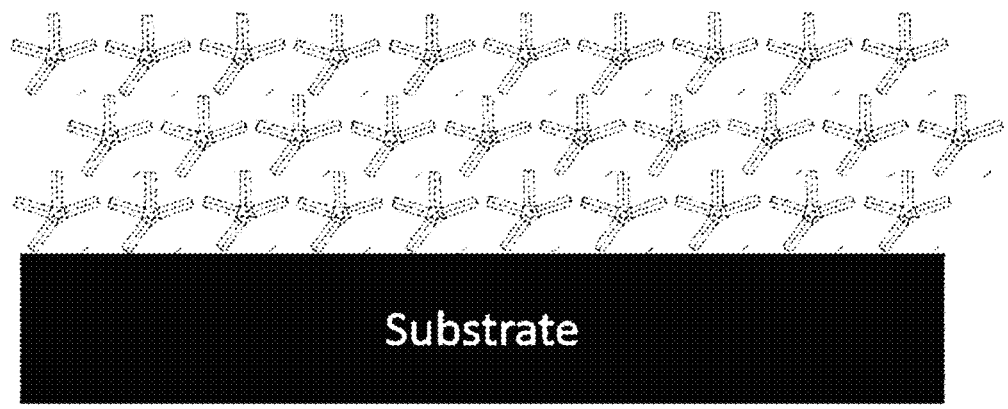
Figure 2C:
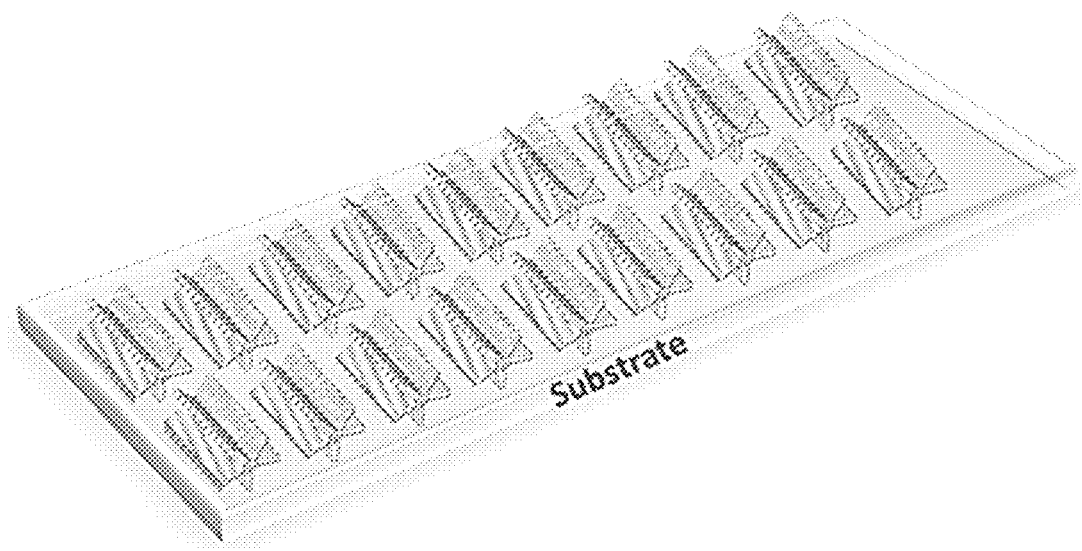
Figure 2D:
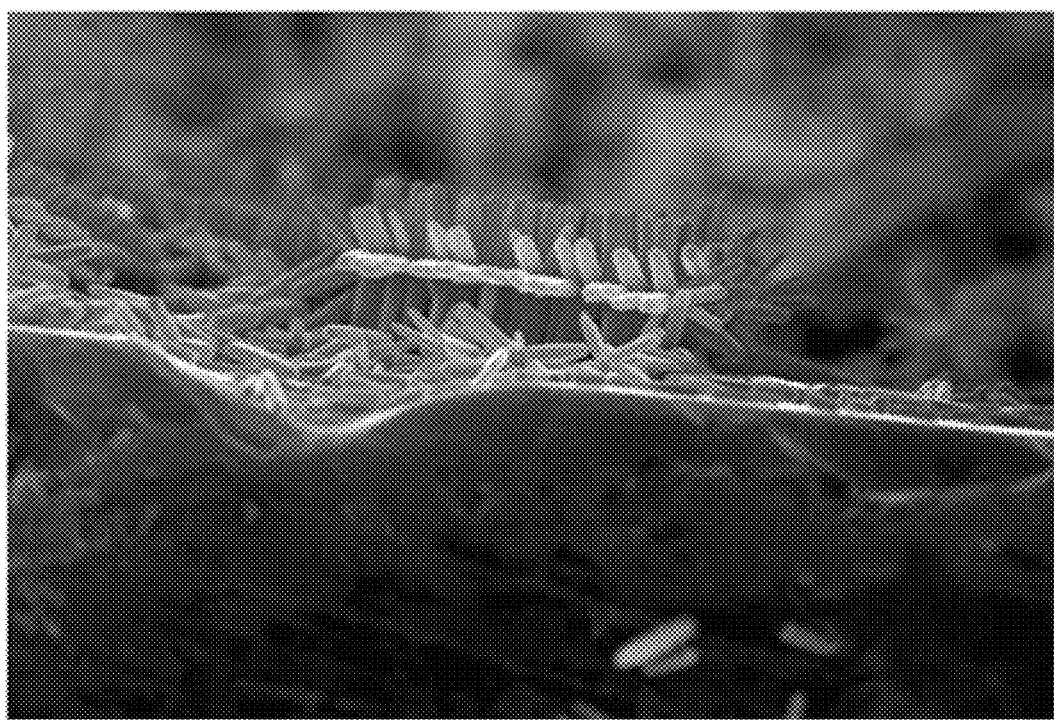
Figure 3A:
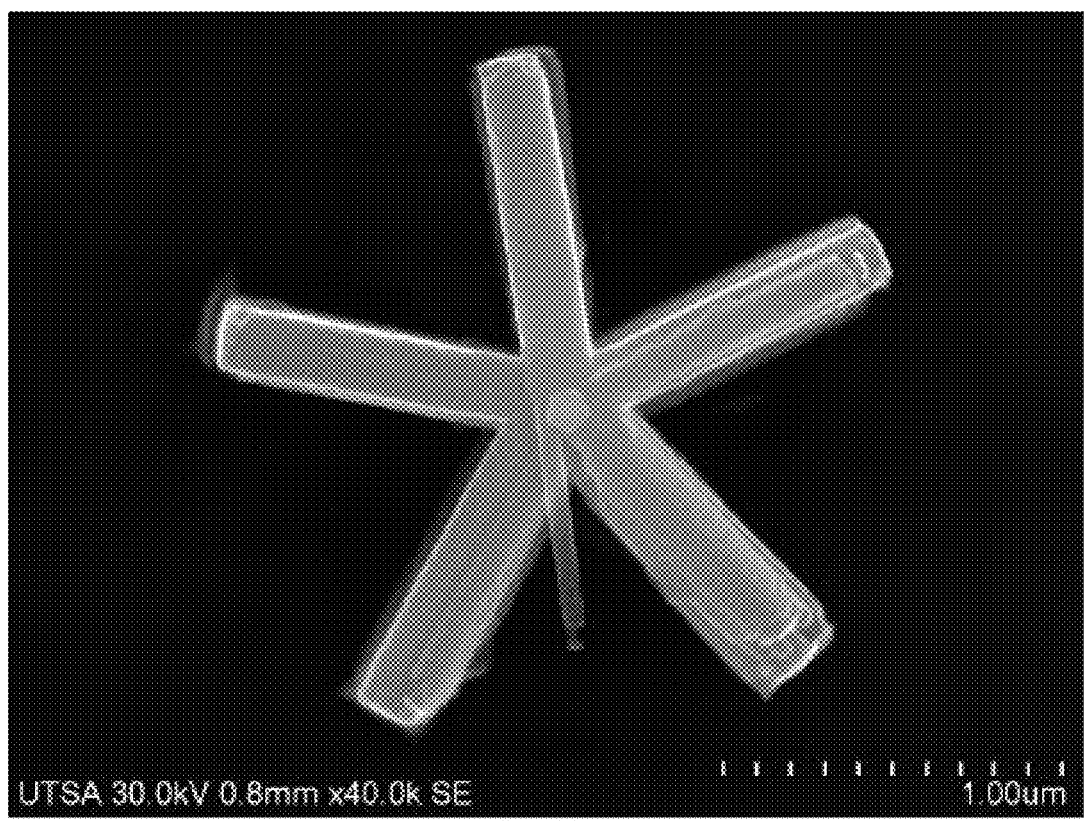
FIGS. 3A-3B depict the multi-pentagonal arrangement of Ag/ZnO nanorods.
Figure 3B:
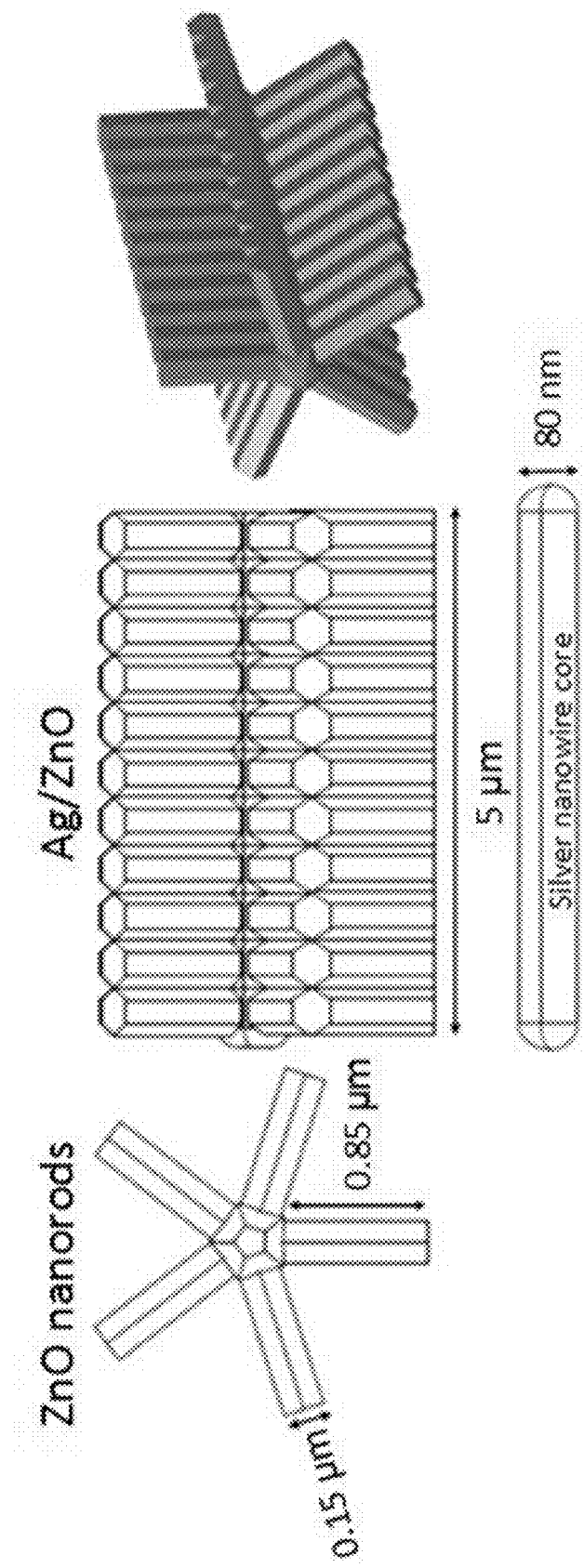
Figure 4:
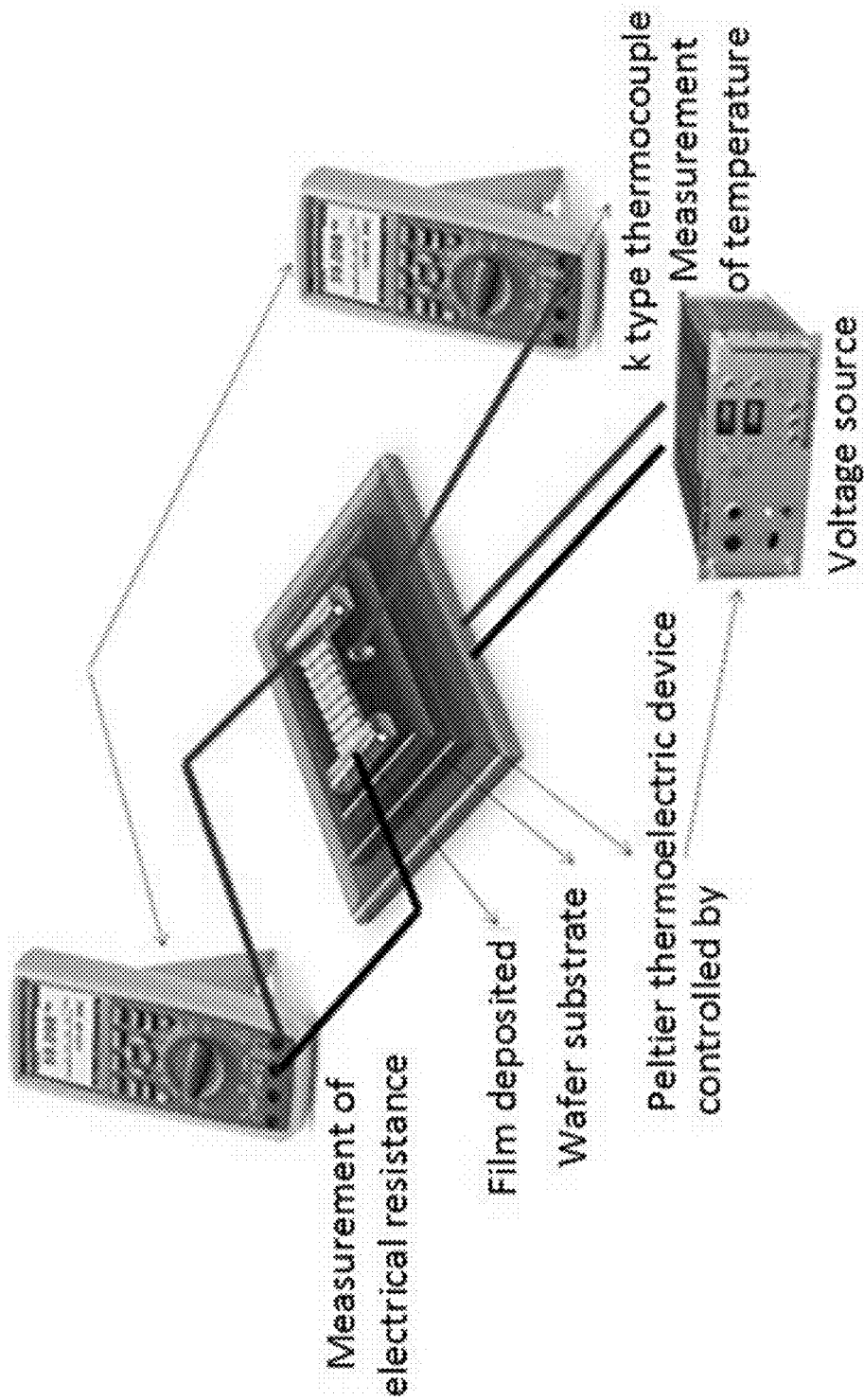
FIG. 4 is a diagram of the Thermal Coefficient Resistance (TCR) set up for measuring the infrared response when the active element (Ag/ZnO) is working as bolometric material.

FIG. 1A shows a plane view micrograph of Ag/ZnO nanosystem, as obtained from the reaction process. There it is observed the well-defined pentagonal distribution with the ZnO nanorods growing perpendicular to the facets of silver wires. For comparison, FIG. 1B shows a computer model with well-defined distribution obtained in the process described herien.

The present disclosure provides a detail highlight in describing the nanostructures and bolometric materials for the detection of infrared radiation for a bolometric configuration. This bolometric nanomaterial can have: an electrical active core silver nanowire for supporting zinc oxide nanorods. The bolometric material can then be deposited by drop coating in a substrate forming a thin layer about 70 μm forming the bolometric layer. After deposition, the substrate can be then connected with two electrical terminals in inter-counter opposite side to serve as conductors lead wires for electrical measurements. This pair of connecting terminals can provide conducting lines electrically connected to the substrate that once electrically connected to a gain circuit allowing for the amplification for the absorption level signal output produced by the active element (Ag/ZnO) on the bolometer.

A variety of nanostructures are provided. The nanostructures can include a metal nanowire having a plurality of faces extending along a length of the nanowire. The nanowire can have 2, 3, 4, 5, or more faces extending along the length of the nanowire. For example, the nanowire can have a pentagonal cross section and five faces extending along the length of the nanowire. In various other aspects the nanowire can have a square cross section and four faces extending along the length of the nanowire, or can have a hexagonal cross section and six faces extending along the length of the nanowire. In some aspects the metal nanowire is a sliver nanowire having a pentagonal cross section and five faces extending along the length of the nanowire. The nanowire can be a silver nanowire, a gold nanowire, a nickel nanowire, an iron nanowire, a copper nanowire, or a combination thereof. The metal nanowire can have a length of about 10 nm to 10 μm and/or a diameter of about 5 nm to 500 nm.

The nanostructures can have a plurality of semiconductor nanorods extending from the surfaces of the nanostructure. For example, the semiconductor nanorods can form two or more nanorod arrays, wherein each of the nanorod arrays is attached to a different surface of the nanowire. Each of the nanorod arrays can be along a surface extending the length of the nanowire. The semiconductor nanorods can include metal oxide nanorods such as oxides of cadmium, gallium, indium, tin, zinc, and combinations thereof. The semiconductor nanorods can have an average diameter of about 10 nm to 250 nm, about 50 nm to 250 nm, about 50 nm to 200 nm, or about 100 nm to 200 nm. The semiconductor nanorods can have an average length of about 100 nm to 1.5 μm, about 500 nm to 1.5 μm, about 500 nm to 1 μm, about 600 nm to 1 μm, or about 800 nm to 1 μm Bolometric materials are providing containing a plurality of the nanostructures described herein. The bolometric materials can include the nanostructures on a surface of a substrate, e.g. a silicon substrate. The bolometric materials can include a conductive polymer wherein the nanostructures are embedded in the conductive polymer. The bolometric materials can further include electrodes attached to the substrate. The bolometric material can have a temperature coefficient of resistance that is about −8% $K^{-1}$ to −20% $K^{-1}$, about −10% $K^{-1}$ to −20% $K^{-1}$, about −10% $K^{-1}$ to −18% $K^{-1}$, about −10% $K^{-1}$ to −15% $K^{-1}$, about −10% $K^{-1}$ to −12% $K^{-1}$, or about −11% $K^{-1}$. The bolometric materials can have a maximum temperature coefficient of resistance at a temperature from about 285 K to 310 K, about 290 K to 310 K, about 290 to 300 K, or about 290 K to 295 K.

The bolometric materials can be incorporated into a variety of electronic devices including a monocular scope, a binocular scope, a digital camera, a video camera, an infrared thermometer, a night vision device, and a combination thereof.

Methods of Making the Nanostructures and Bolometric Materials

Methods of making the nanostructures and bolometric materials are also provided. The methods can include combining a metal salt and a reducing agent in a first solution for a first period of time to produce a metal nanowire having a plurality of faces extending along a length of the nanowire. Suitable metal salts can include, but are certainly not limited to, silver nitrate ($AgNO_3$), silver acetate ($CH_3COO)_2Ag$), silver perchlorate ($AgClO_4$), gold perchlorate ($Au(ClO_4)_3$), palladium chloride ($PdCl_2$), platinum chloride ($PtCl_2$), nickel sulfate ($NiSO_4$), copper sulfate ($CuSO_4$), copper chloride ($CuCl_2$) and the like. Typically, the metal salt is soluble in the reducing solvent (e.g. ethylene glycol) and dissociates into oppositely charged metal ion and the counterion. In various aspects the metal nanowire is a silver nanowire and the metal salt is a silver salt such as $AgNO_3$. The first period of time can be about 30 minutes to 180 minutes, about 30 minutes to 120 minutes, or about 30 minutes to 90 minutes. The methods can include heating the first solution to an elevated temperature, e.g. about 140° C. to 200° C., about 140° C. to 180° C., or about 150° C. to 170° C.

The methods can include combining the metal nanowire and a semiconductor precursor in a second solution for a second period of time to produce a plurality of semiconductor nanorods forming two or more nanorod arrays, wherein each of the nanorod arrays is attached to a different surface of the nanowire. In various aspects, the semiconductor nanorods are zinc oxide nanorods and the semiconductor precursor is a solution of zinc acetate dihydrate and hexamethylenetetramine. The second period of time can be about 30 minutes to 180 minutes, about 30 minutes to 120 minutes, or about 30 minutes to 90 minutes. The methods can include heating the second solution and/or irradiating the second solution with microwave radiation.

The methods can include drop coating the nanostructures onto a surface of a substrate such as silicon. The nanostructures can form a thin film on the surface of the substrate, e.g. having a thickness of about 10 μm to 200 μm, about 10 μm to 150 μm, about 10 μm to 100 μm, or about 50 μm to 100 μm. The methods can include casting the nanostructures onto the surface of the substrate in a conductive polymer, e.g. as a matrix to adhere the nanostructures to the substrate.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Fabrication

Figure 5A:
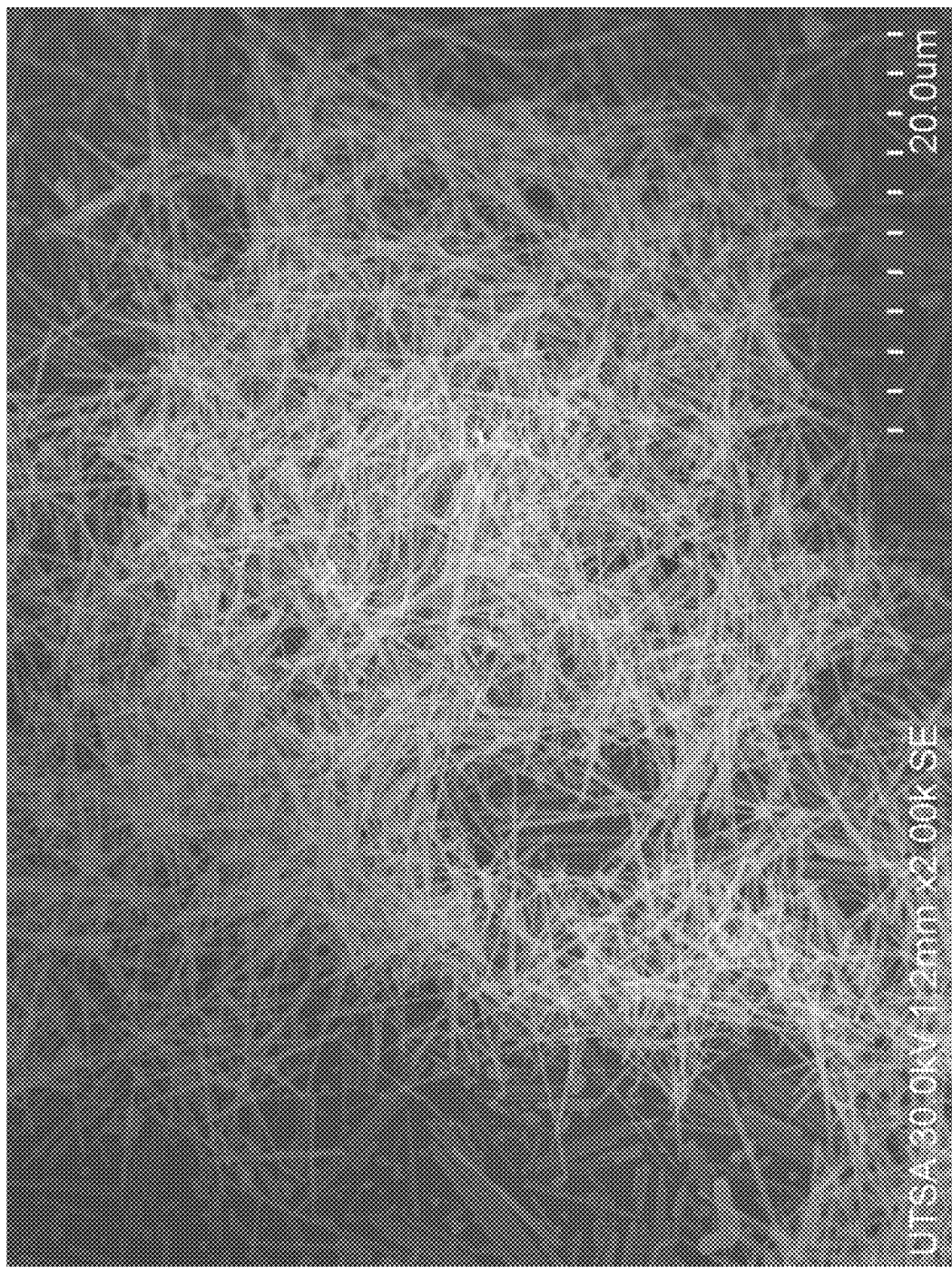
FIGS. 5A-5F show the SEM images for (FIG. 5A) Ag nanowires, (FIG. 5B) ZnO nanoflakes and (FIGS. 5B-5F) for Ag/ZnO nanostructures with different intermetallic—semiconductor concentration ratios.
Figure 5B:
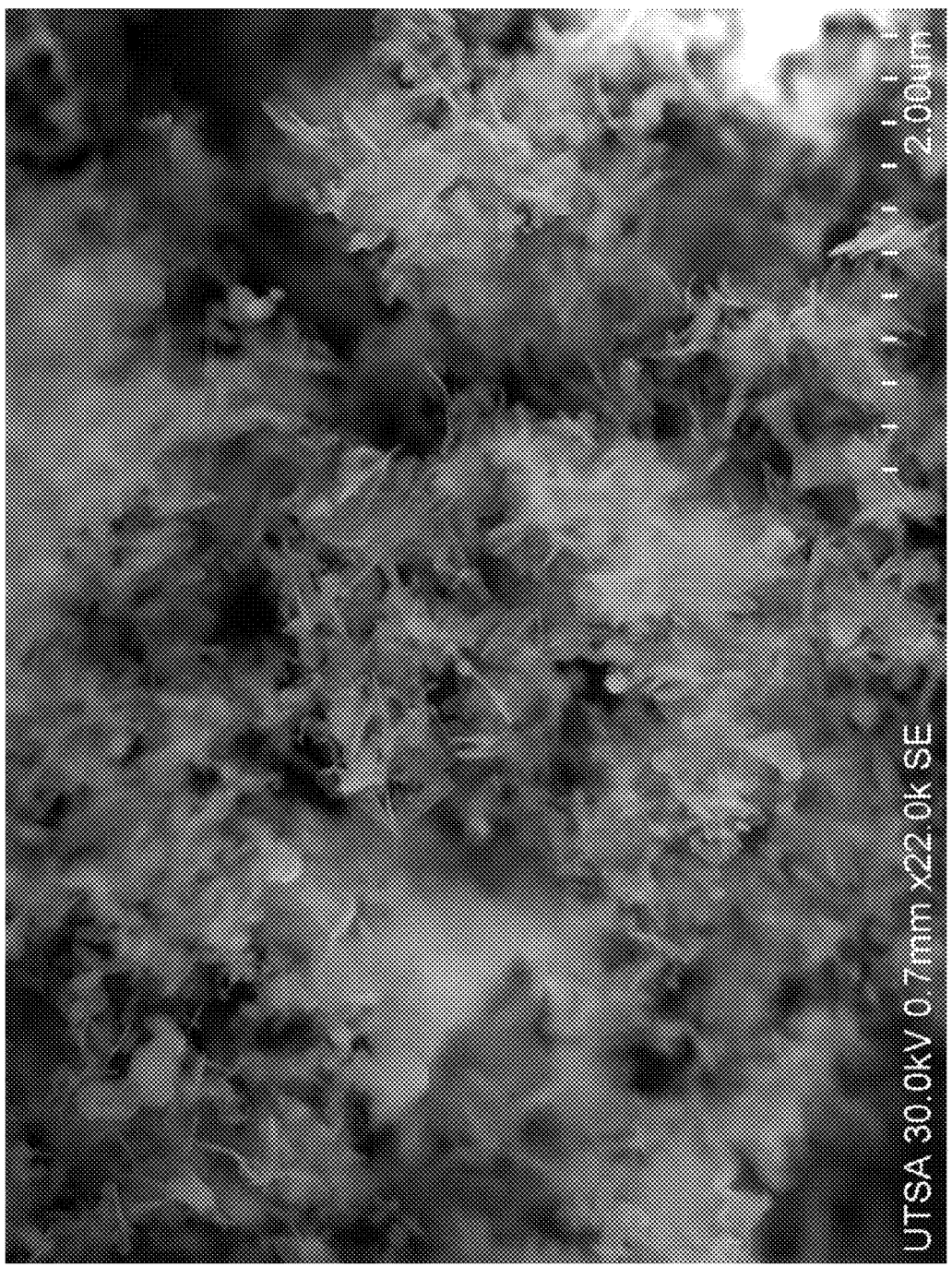
Figure 5C:
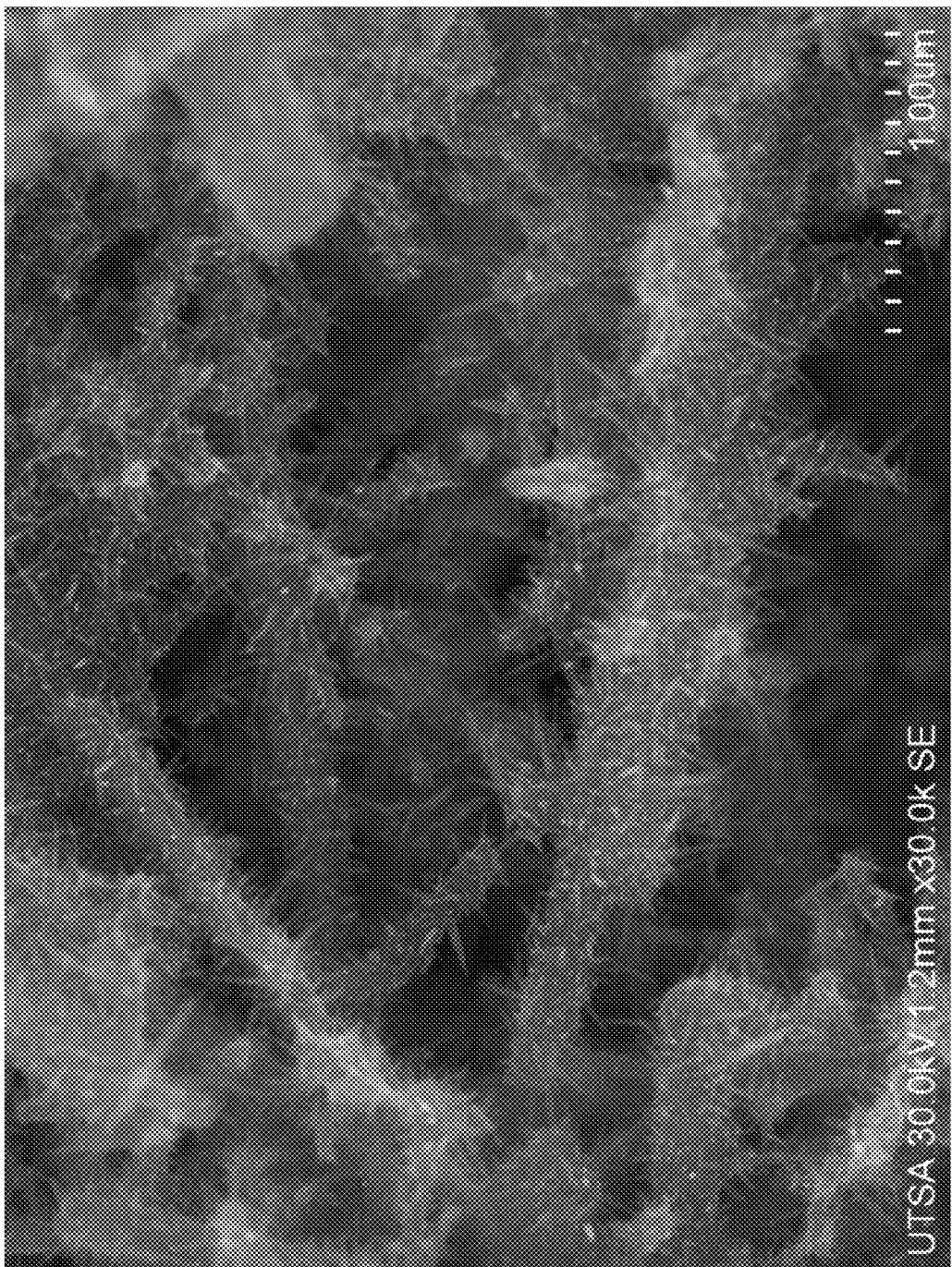
Figure 5D:
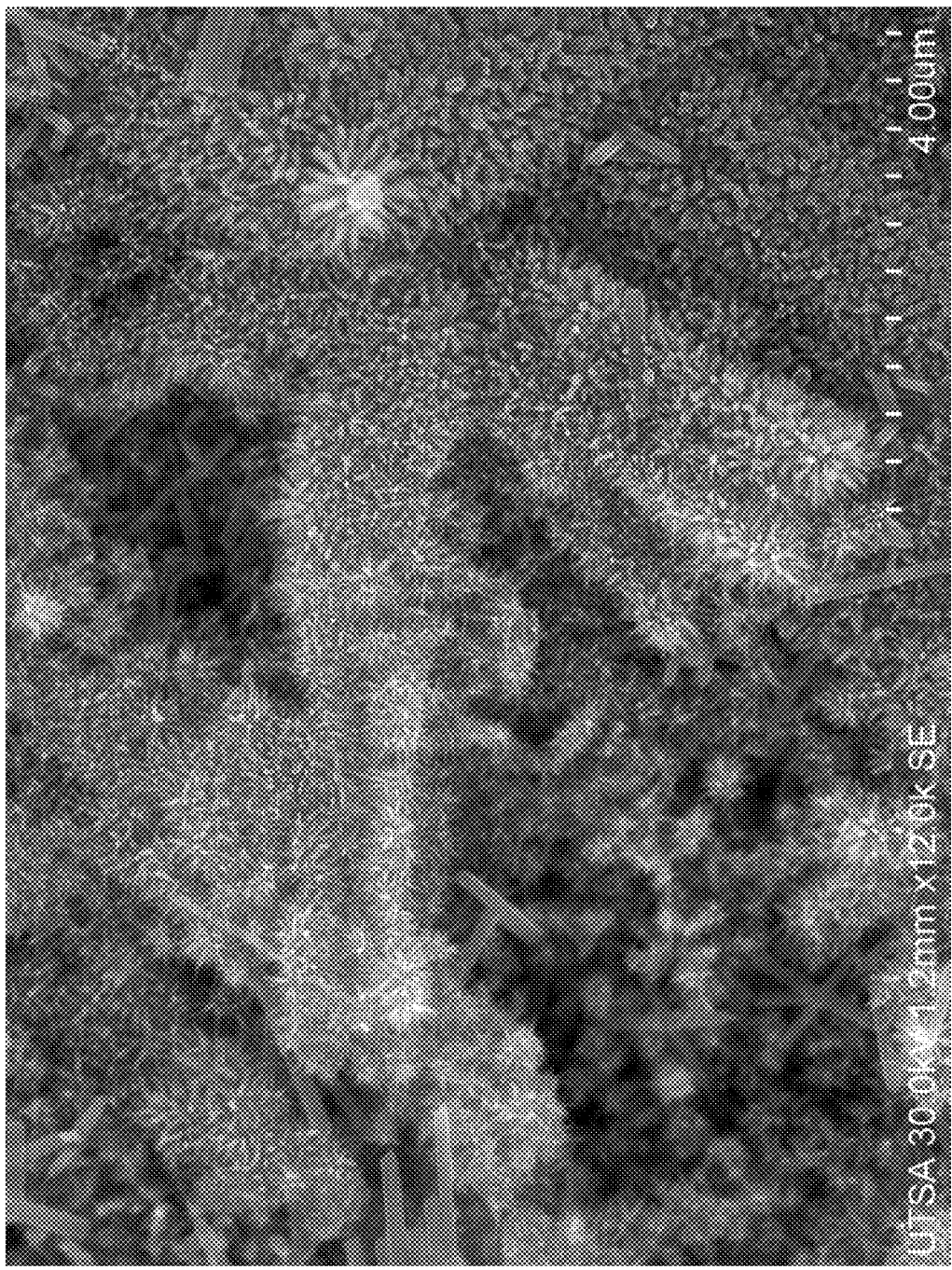
Figure 5E:
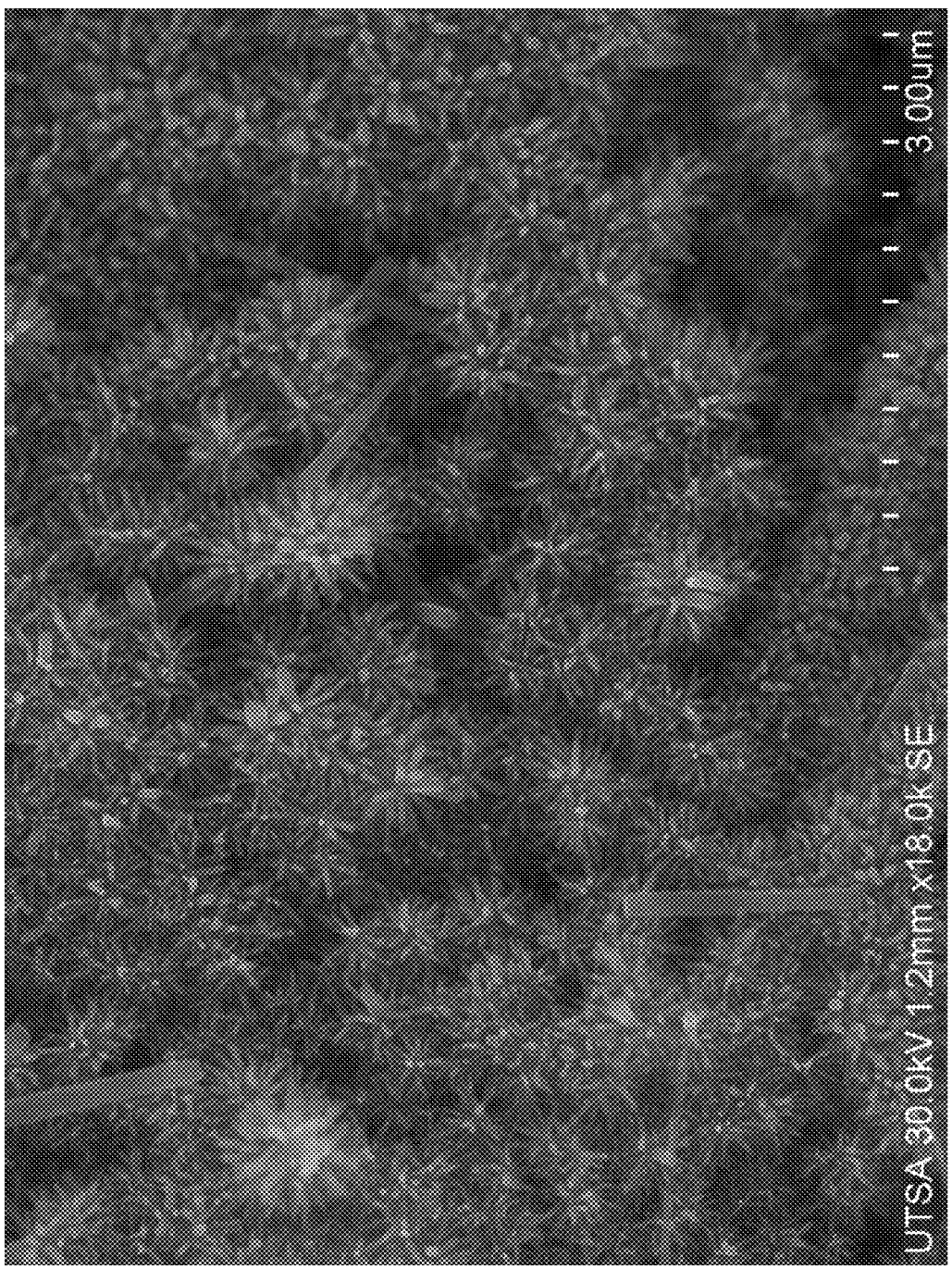
Figure 5F:
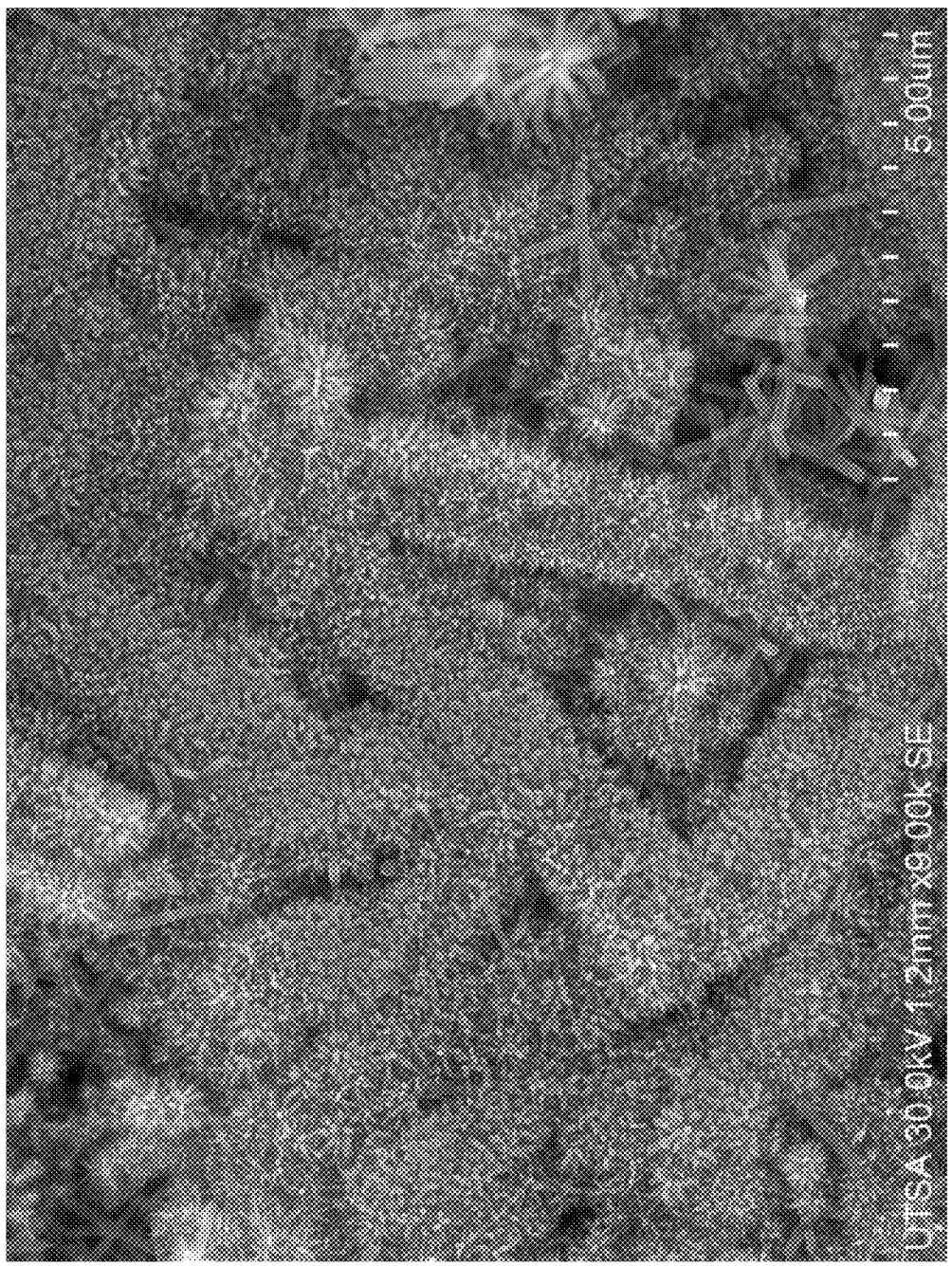

The procedure for the fabrication of the Ag/ZnO nanostructure bolometer is outlined. Briefly, the Ag/ZnO metal-semiconductor nanostructures are synthesized by establishing a two-step process. First, silver nanowires were fabricated by following the polyol method: 5 ml of ethylene glycol (EG) were heated at 160° C. for 40 min; next, a silver nitrate $AgNO_3$ (reagent grade 99.99% by Sigma-Aldrich) was reduced in a solution of EG following the addition of polyvinyl pyrrolidone (PVP, Mw 55,000 reagent grade 99.99% by Sigma-Aldrich); (EG) and (PVP) acted as reducer solution and capping agent to polar molecules, respectively; the mixture was subjected to a constant stirring rate for a period time, 40 to 60 min., until the silver nanowires reached the desired and most stable diameter (~70 nm) and length (more than 2 μm). As for the second part, during the self-assembling process of ZnO nanorods on silver nanowires (Ag-NWs), Zinc acetate dihydrate (Zn(Ac)$_2$, 98% reagent by Sigma-Aldrich), 51725 mM and hexamethylenetetramine (HMT) 51725 mM were dissolved in deionized water to form a precursor initial solution; next, 200 μl of silver nanowires, as obtained by the polyol method, were added to the former solution, which is now irradiated using an ETHOS EZ Microwave Digestion System, working within 400 to 700 W at a microwave frequency of 2.5 GHz. The vial containing the precursor solution was heated between 20° C.-90° C., with an exposure reaction time from 1 to 50 min. FIG. 5A and FIG. 5B show the scanning electron microscopy (SEM) images for the Ag nanowires and ZnO flakes, respectively. FIGS. 5C-5F show the SEM images for the Ag/ZnO nanostructures with different intermetallic-semiconductor concentration ratios.

TCR Measurements

Figure 6:
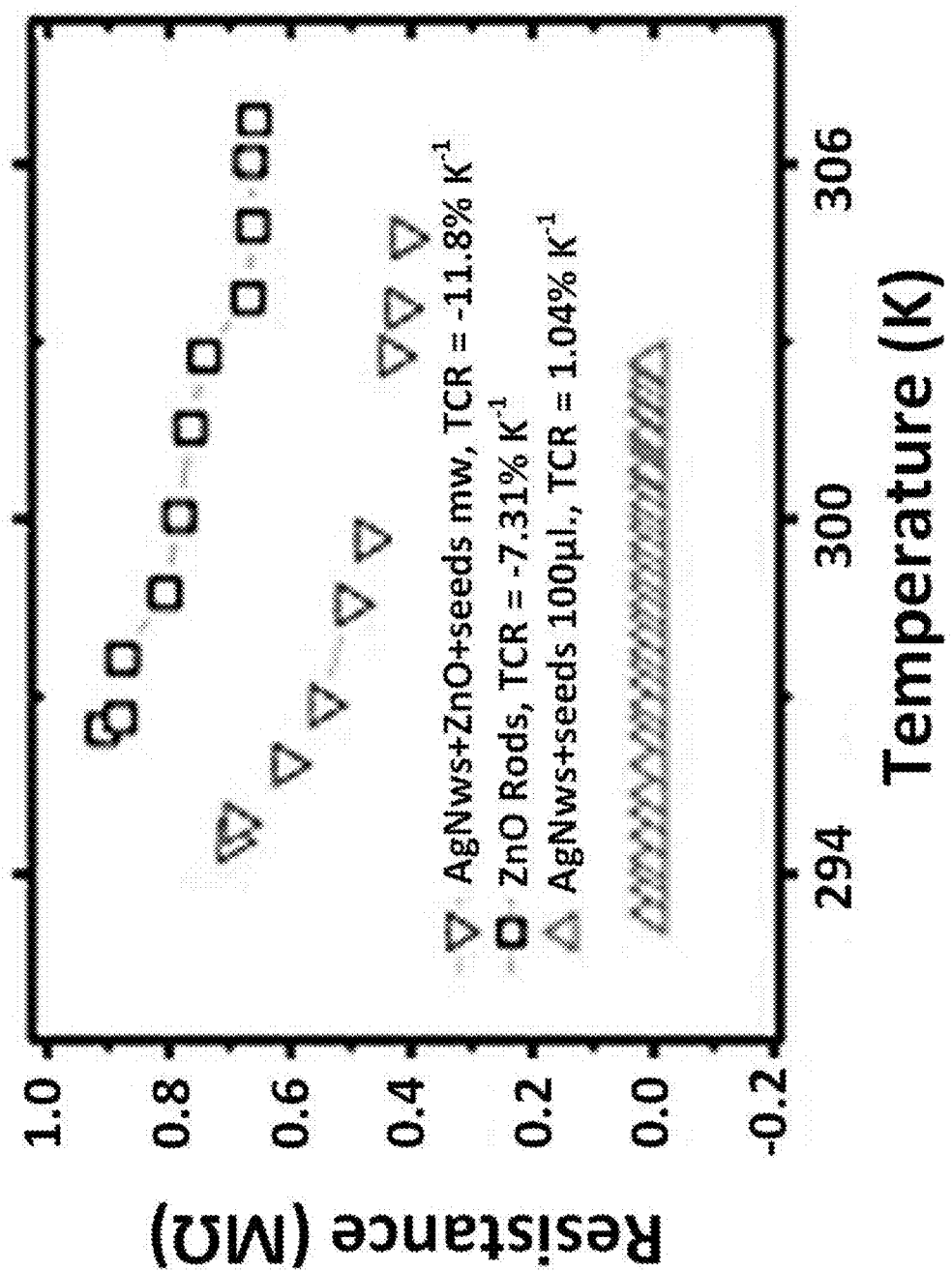
FIG. 6 is a graph of the resistance versus temperature for the three samples of Ag/ZnO nanostructures.
Figure 7A:
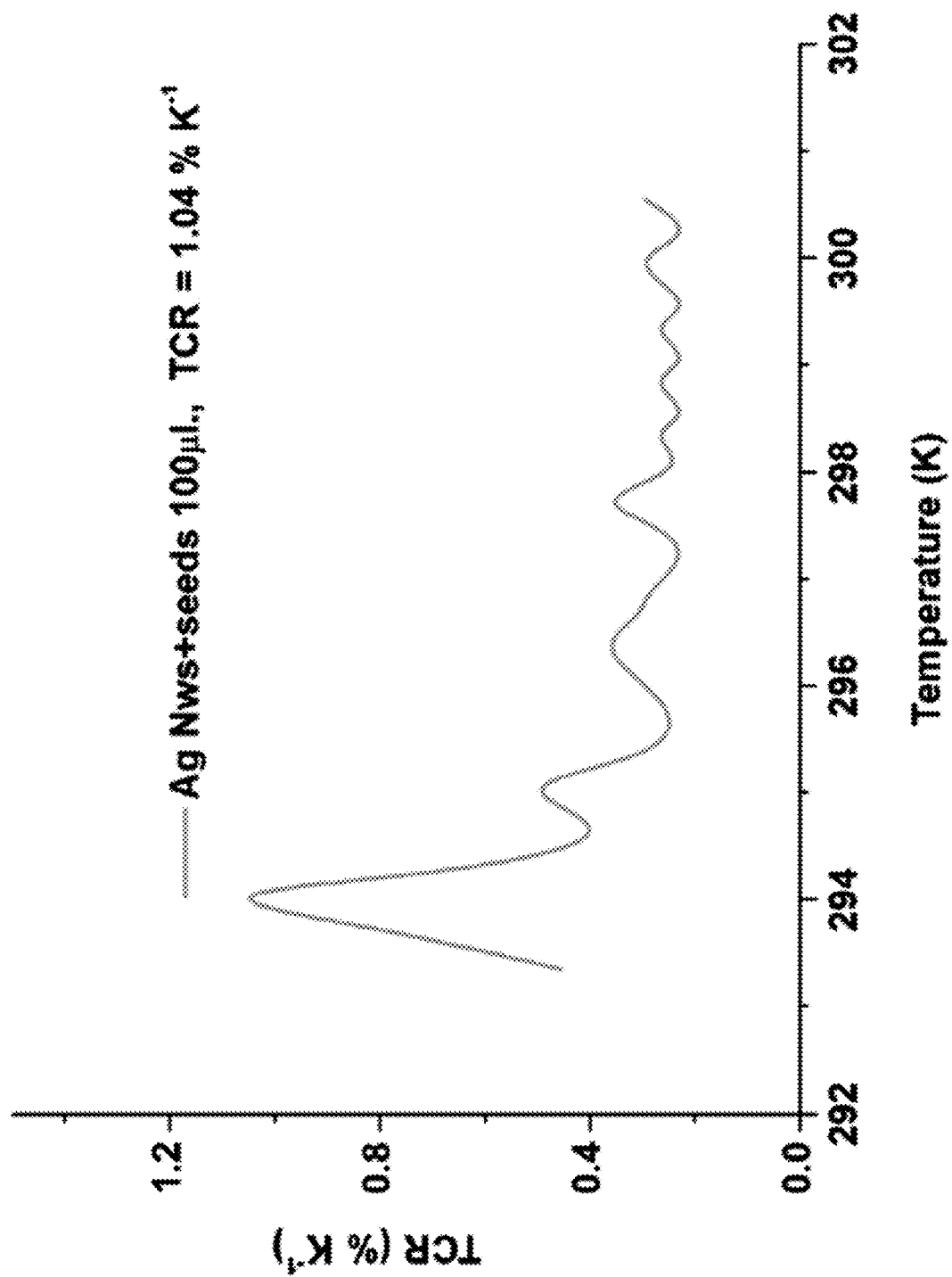
FIGS. 7A-7D are graphs of the temperature coefficient of resistance (TCR) versus temperature for the Ag/ZnO nanostructure bolometers for different concentrations of ZnO.
Figure 7B:
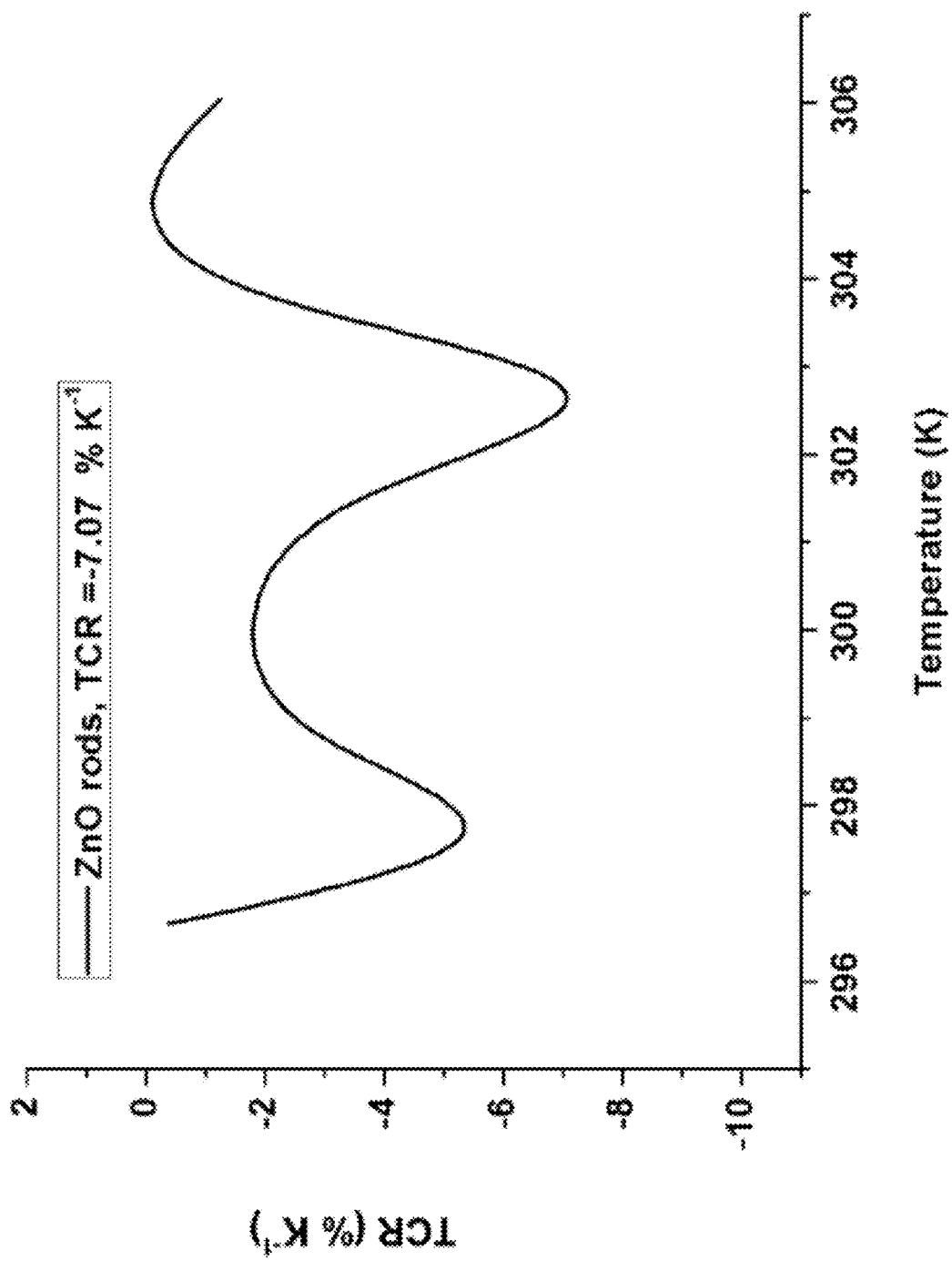
Figure 7C:
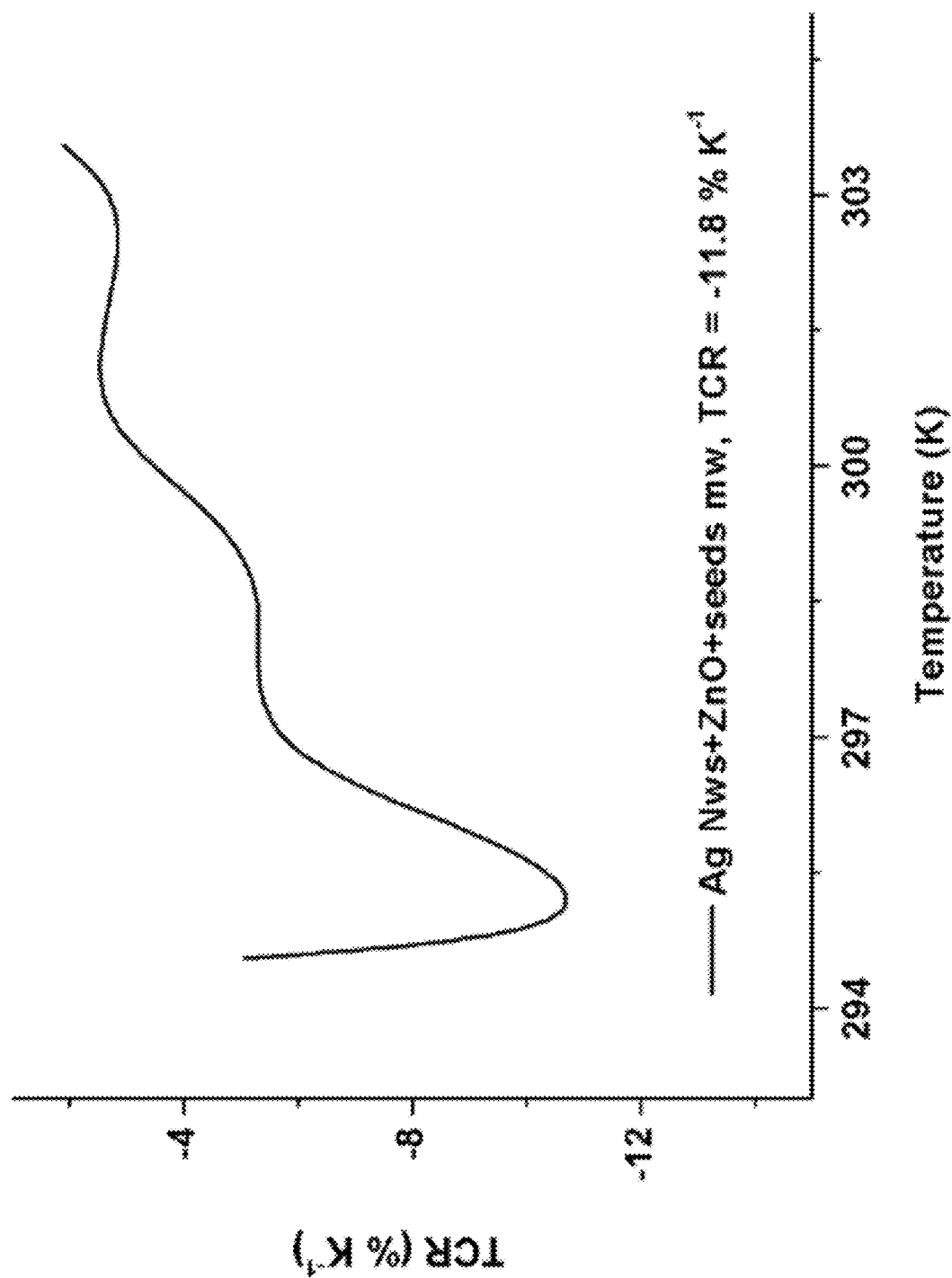
Figure 7D:
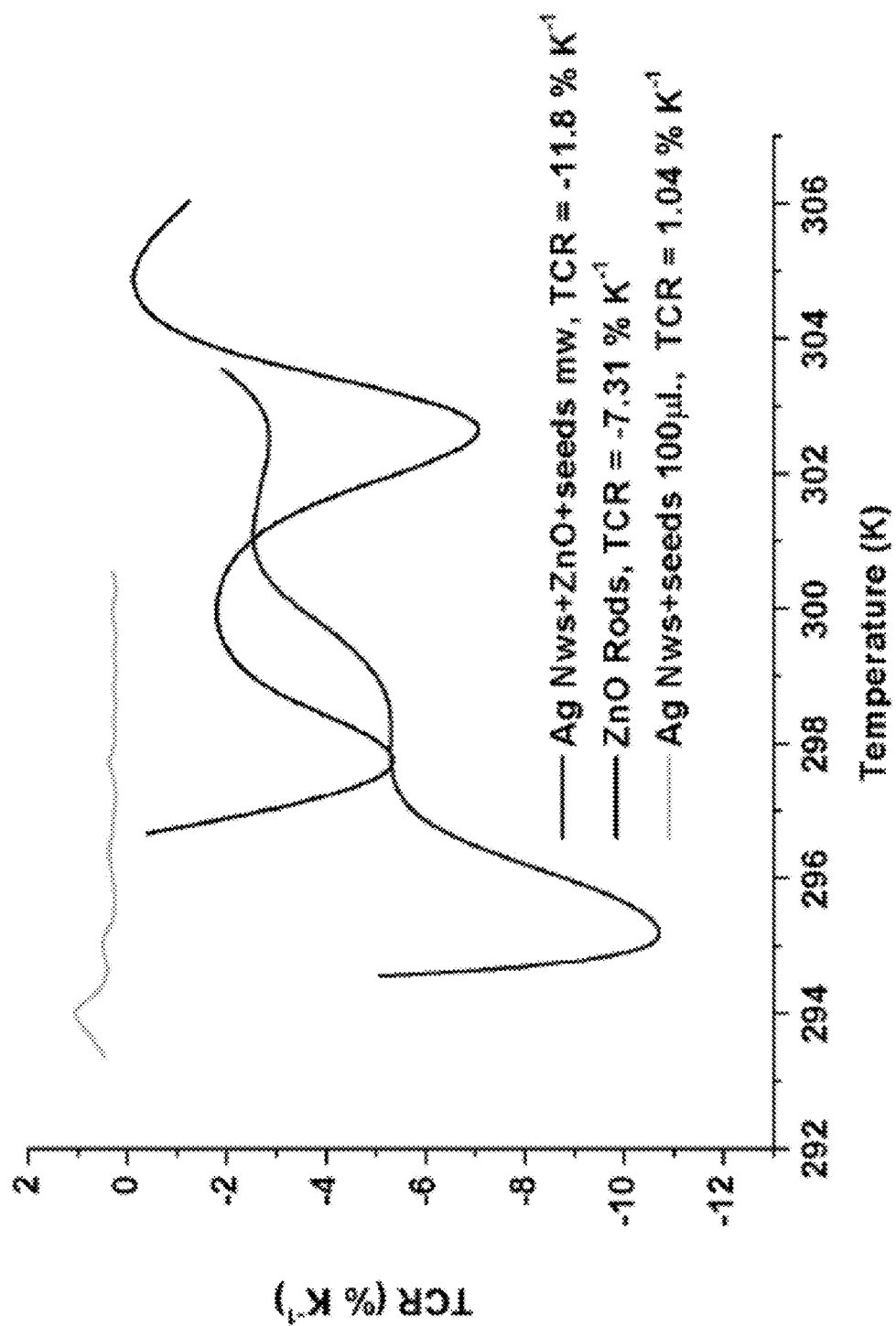

The TCR, which represents the normalized change in the resistance with respect to temperature, is calculated by using the following formula $$\beta = \frac{1}{R}\frac{dR}{dT}$$

where R represents the resistance and T represents the temperature. The resistance versus temperature of the Ag/ZnO for three different concentrations of ZnO is shown in FIG. 6. These three different concentrations result in a different metallic-semiconductor ratio which can be used to tune the conductivity and the thermo-electric characteristics of the material. The curves clearly depict metal/semiconducting characteristics, i.e. an increasing resistance with decreasing temperature occurs. The TCR versus temperature that was obtained from FIG. 6 using the three point method is shown in FIGS. 7A-7D for all three samples. The highest room temperature TCR was obtained on the sample which had a higher concentration of ZnO and can be as high as $-11.8\ K^{-1}$. In Table 1 we have summarized our results for the highest TCR values obtained for each sample. The TCR value and the conductivity of the material can be tuned depending on the concentration of ZnO grown on the Ag nanowires.

TABLE 1

The maximum temperature coefficient of resistance (TCR) value for the samples at temperatures ranging between $292K \leq T \leq 305K$.

| Sample | Maximum TCR | Temperature at TCR |
|---|---|---|
| Ag wires | $1.04 K^{-1}$ | 294K |
| Ag wires + ZnO rods | $-7.07 K^{-1}$ | 303K |
| Ag wires + ZnO rods + seeds | $-11.8 K^{-1}$ | 295K |

Optical Measurements

Figure 8A:
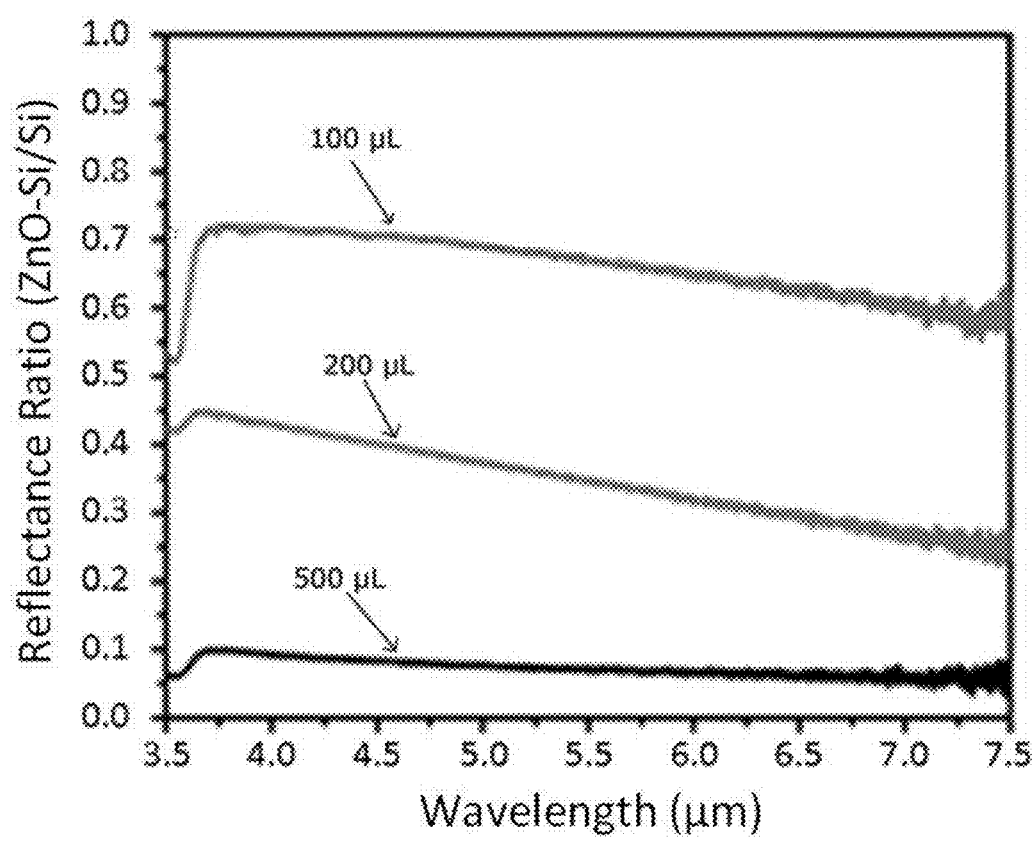
FIGS. 8A-8B are FTIR reflection measurements of ZnO nanostructure bolometer coated onto Si with different concentrations.
Figure 8B:
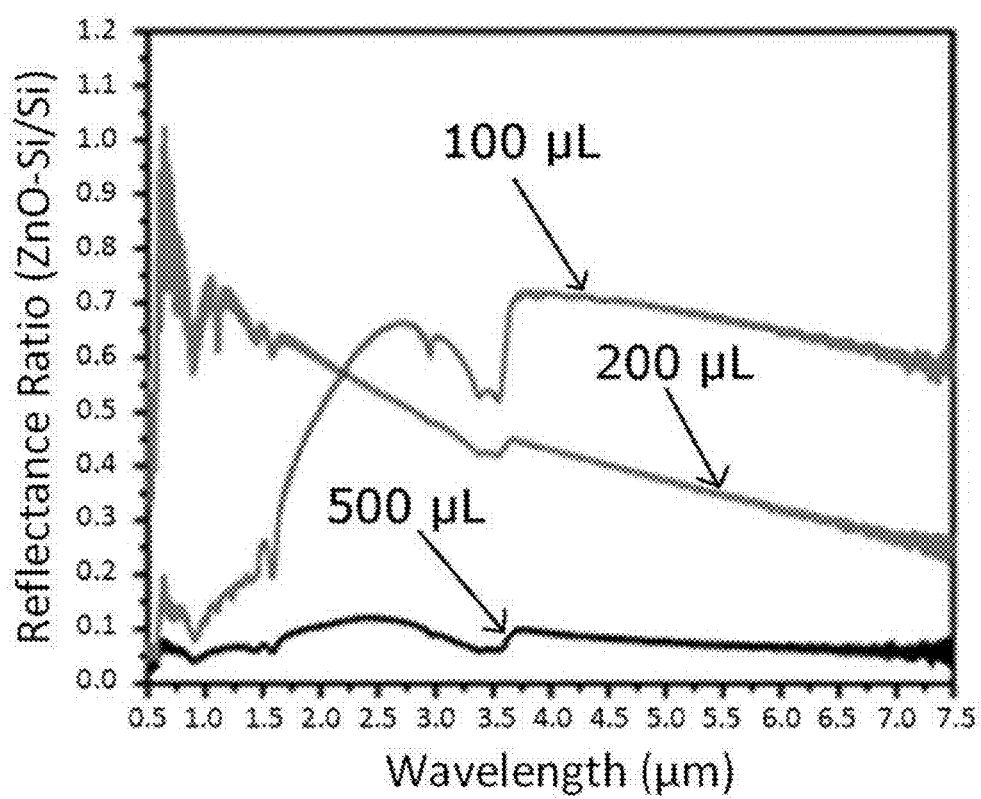

Optical measurements were taken of the ZnO nanoflakes deposited on a silicon (Si) substrate. The optical properties of the samples are described by their complex refractive indices which is given by $N=n+ik$, where n is the refractive index and k is the extinction coefficient. In order to measure the refractive index the spectroscopic ellipsometry technique was used. The mid-wavelength infrared spectra of ZnO were taken with a Bruker IFS66v FTIR spectrometer with a near normal incidence (~7°) geometry. The measurements were performed in a vacuum environment and at room temperature. For control purposes, reflection measurements from ZnO films are performed using a bare Si wafer as a reference. FIGS. 8A-8B show the reflection measurements of three different concentration from ZnO-coated Si samples.

Noise Measurements

The voltage noise spectral density was measured in the frequency range of 1-100 Hz using a Hewlett-Packard HP3562A Dynamic Signal Analyzer, the noise of the system, and the total noise (system+noise of the device) were measured separately and then subtracted (in quadrature) to obtain the noise of the device. In contrast to many other works, this method of measurement was chosen in place of using a chopper, which inherently adds a source of noise to the system and would limit the frequencies at which the studied bolometers could operate.

The noise characterization was performed under different DC voltages, measuring the spectral density of low frequency fluctuations using an HP3562A dynamic signal analyzer, which can measure noise power levels in a frequency range of 64 μHz to 100 kHz.

Results Summary

The electrical and optical properties of Silver/Zinc oxide self-assembled nanostructure were examined for applications in uncooled microbolometers. We have shown that Ag/ZnO self-assembled nanostructure bolometers present high room temperature TCR values up to $-11.8\ K^{-1}$ and that the TCR and conductivity of the material can be tuned with the Ag/ZnO concentration ratio. From our results we inferred that intermetallic-semiconductor nanostructures can be used in uncooled microbolometers because their electrical and optical properties can be tailored depending on the concentration ratio used in their fabrication. This tuning can be used to increase the response of the device or to better match the device's electrical impedance to a Read-out integrated circuit for a particular system application.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A nanostructure comprising
   a metal nanowire having a plurality of faces extending along a length of the nanowire, and
   a plurality of semiconductor nanorods forming two or more nanorod arrays,
   wherein each of the nanorod arrays is attached to a different surface of the nanowire.

2. The nanostructure of claim 1, wherein the metal nanowire is a silver nanowire having a pentagonal cross section and five faces extending along the length of the nanowire, and
   wherein the semiconductor nanorods are metal oxide nanorods forming five nanorod arrays extending along each of the five faces of the silver nanowire.

3. The nanostructure of claim 1, wherein the metal nanowire is selected from the group consisting of a silver nanowire, a gold nanowire, a nickel nanowire, an iron nanowire, a copper nanowire, and a combination thereof.

4. The nanostructure of claim 1, wherein the semiconductor nanorods are metal oxide nanorods selected from the group consisting of oxides of cadmium, gallium, indium, tin, zinc, and combinations thereof.

5. The nanostructure of claim 1, wherein the metal nanowire has a length of about 10 nm to 10 μm.

6. The nanostructure of claim 1, wherein the metal nanowire has a diameter of about 5 nm to 500 nm.

7. The nanostructure of claim 1, wherein the semiconductor nanorods have an average diameter of about 50 nm to 250 nm.

8. The nanostructure of claim 1, wherein the semiconductor nanorods have an average length of about 500 nm to 1.5 μm.

9. A bolometric material comprising a plurality of the nanostructures according to claim 1 on a surface of a substrate.

10. The bolometric material of claim 9, wherein the substrate is a silicon substrate.

11. The bolometric material of claim 9, further comprising a conductive polymer wherein the nanostructures are embedded in the conductive polymer.

12. The bolometric material of claim 9, wherein the material has a temperature coefficient of the resistance that is about $-10$ $K^{-1}$ to $-18$ $K^{-1}$.

13. The bolometric material of claims 9, wherein the material has a maximum temperature coefficient of the resistant at a temperature from 285 K to 310 K.

14. The bolometric material of claim 9, wherein the metal nanowire is a silver nanowire having a pentagonal cross section and five faces extending along the length of the nanowire, and
wherein the semiconductor nanorods are metal oxide nanorods forming five nanorod arrays extending along each of the five faces of the silver nanowire.

15. The bolometric material of claim 11, wherein the plurality of nanostructures form a layer on the substrate having a thickness of about 10 μm to 150 μm.

16. A method of making a nanostructure according to acclaim 1, the method comprising the steps of
combining a metal salt and a reducing agent in a first solution for a first period of time to produce a metal nanowire having a plurality of faces extending along a length of the nanowire,
combining the metal nanowire and a semiconductor precursor in a second solution for a second period of time to produce a plurality of semiconductor nanorods forming two or more nanorod arrays, wherein each of the nanorod arrays is attached to a different surface of the nanowire.

17. The method of claim 16, wherein the metal nanowire is a silver nanowire and the metal salt is a silver salt such as $AgNO_3$, and
wherein the semiconductor nanorods are zinc oxide nanorods and the semiconductor precursor is a solution of zinc acetate dihydrate and hexamethylenetetramine.

18. The method of claim 16, wherein the first period of time, the second period of time, or both are from about 30 minutes to 60 minutes.

19. The method of claim 16, wherein the method further comprises heating one or both of the first solution and the second solution.

20. The method of claim 16, wherein the method further comprises irradiating the second solution with microwave radiation.

* * * * *